US008669675B2

(12) United States Patent  
Capp et al.

(10) Patent No.: US 8,669,675 B2
(45) Date of Patent: Mar. 11, 2014

(54) POWER CONVERTER FOR A SOLAR PANEL

(71) Applicant: Beacon Power, LLC, Tyngsboro, MA (US)

(72) Inventors: F. William Capp, Boston, MA (US); William J. Driscoll, Westford, MA (US)

(73) Assignee: Beacon Power, LLC, The Woodlands, TX (US)

( * ) Notice: Subject to any disclaimer, the term of this patent is extended or adjusted under 35 U.S.C. 154(b) by 0 days.

(21) Appl. No.: 13/785,857

(22) Filed: Mar. 5, 2013

(65) Prior Publication Data

US 2013/0181533 A1   Jul. 18, 2013

Related U.S. Application Data

(63) Continuation of application No. 13/282,037, filed on Oct. 26, 2011, which is a continuation of application No. 10/556,764, filed as application No. PCT/US2004/016668 on May 27, 2004, now Pat. No. 8,102,144.

(60) Provisional application No. 60/473,749, filed on May 28, 2003.

(51) Int. Cl.
*H02J 3/00*   (2006.01)

(52) U.S. Cl.
USPC ................ 307/82; 307/43; 136/244; 320/101

(58) Field of Classification Search
USPC ............................. 136/244; 307/82; 320/101
See application file for complete search history.

(56) References Cited

U.S. PATENT DOCUMENTS

| 5,513,075 | A |  | 4/1996 | Capper et al. |
|---|---|---|---|---|
| 5,684,385 | A |  | 11/1997 | Guyonneau et al. |
| 5,747,967 | A | * | 5/1998 | Muljadi et al. ................ 320/148 |
| 5,793,184 | A |  | 8/1998 | O'Connor |
| 6,046,919 | A |  | 4/2000 | Madenokouji et al. |
| 6,169,678 | B1 |  | 1/2001 | Kondo et al. |
| 6,281,485 | B1 | * | 8/2001 | Siri ............................ 250/203.4 |
| 6,429,621 | B1 |  | 8/2002 | Arai |
| 6,433,522 | B1 |  | 8/2002 | Siri |
| 6,448,489 | B2 | * | 9/2002 | Kimura et al. ................ 136/244 |
| 6,628,011 | B2 |  | 9/2003 | Droppo et al. |
| 6,664,762 | B2 |  | 12/2003 | Kutkut |

(Continued)

FOREIGN PATENT DOCUMENTS

| DE | 3729000 A1 | 3/1989 |
|---|---|---|
| DE | 4032569 A1 | 4/1992 |

(Continued)

OTHER PUBLICATIONS

Office Action issued in corresponding U.S. Appl. No. 13/282,037 dated Jul. 29, 2013 (42 pages).

*Primary Examiner* — Jared Fureman
*Assistant Examiner* — Alfonso Perez Borroto
(74) *Attorney, Agent, or Firm* — Osha Liang LLP

(57) ABSTRACT

A solar array power generation system includes a solar array electrically connected to a control system. The solar array has a plurality of solar modules, each module having at least one DC/DC converter for converting the raw panel output to an optimized high voltage, low current output. In a further embodiment, each DC/DC converter requires a signal to enable power output of the solar modules.

20 Claims, 3 Drawing Sheets

(56) References Cited

U.S. PATENT DOCUMENTS

| | | |
|---|---|---|
| 6,838,856 B2 | 1/2005 | Raichle |
| 7,733,069 B2 | 6/2010 | Toyomura et al. |
| 2002/0063552 A1 | 5/2002 | Arakawa |
| 2002/0078991 A1 | 6/2002 | Nagao et al. |
| 2003/0002303 A1 | 1/2003 | Riggio et al. |
| 2003/0047207 A1 | 3/2003 | Aylaian |
| 2003/0075211 A1 | 4/2003 | Makita et al. |
| 2003/0090233 A1 | 5/2003 | Browe |
| 2003/0201674 A1 | 10/2003 | Droppo et al. |
| 2004/0207366 A1 | 10/2004 | Sung |
| 2005/0172995 A1 | 8/2005 | Rohrig et al. |

FOREIGN PATENT DOCUMENTS

| | | |
|---|---|---|
| DE | 4325436 A1 | 2/1995 |
| DE | 4328511 A1 | 3/1995 |
| DE | 19502762 A1 | 8/1996 |
| DE | 19538946 C1 | 4/1997 |
| DE | 19609189 A1 | 9/1997 |
| DE | 19618882 A1 | 11/1997 |
| DE | 19904561 C1 | 8/2000 |
| DE | 10136147 A1 | 2/2003 |
| JP | 08-185235 A | 7/1996 |
| JP | 2000307144 A | 11/2000 |
| JP | 2004055603 A | 2/2004 |

* cited by examiner

POWER CONVERTER FOR A SOLAR PANEL

CROSS-REFERENCE TO RELATED APPLICATIONS

The present application is a continuation of, and therefore claims benefit under 35 U.S.C. §120 to, U.S. patent application Ser. No. 13/282,037, filed on Oct. 26, 2011, which claims benefit under 35 U.S.C. §120 to U.S. patent application Ser. No., 10/556,764, filed on Nov. 15, 2005, and issued as U.S. Pat. No. 8,102,144 on Jan. 24, 2012, which is a national stage entry of International Patent Application No. PCT/US04/16668, filed on May 27, 2004, which claims priority pursuant to 35 U.S.C. 119 (e) to U.S. Provisional Patent Application No. 60/473,749, filed May 28, 2003. These priority applications are hereby incorporated by reference in their entirety herein.

BACKGROUND OF THE INVENTION

1. Field of the Invention

The subject disclosure relates to systems for utilizing power generated by solar panels, and more particularly to an improved system for converting the power generated by a solar panel to improve safety and efficiency.

2. Background of the Related Art

In the modern world, the needs for electrical power are ubiquitous. However, many of the sources of electrical power such as nuclear energy and coal or fossil fuel power generation plants are not always feasible, and generate not only power but excessive pollution, exhaustion of resources and controversy. In an effort to avoid these drawbacks by utilizing the renewable energy of the sun, photovoltaic solar panel arrays are finding expanded use in the home environment and industry. Solar panel arrays are particularly well-suited to stand alone applications in isolated regions. Solar panel arrays not only function as an alternate energy source but excess power can be sold back to utility companies or stored for later use.

Referring to FIG. 1, a conventional home system is referred to generally by the reference numeral 10. The system 10 includes a solar panel array or solar array 20 mounted on a roof 22 and electrically connected to a control system 40. By mounting the solar array 20 on the roof 22, a maximum amount of sunlight, represented by arrows 24, without interference from trees, buildings or other obstructions is more likely. The control system 40 is typically stored within the basement of the house, and provides power to the load 26. The load 26 may also receive power from the utility grid 28 in a conventional manner.

The solar array 20 has a plurality of solar modules 30a-n which are comprised of a number of solar cells. Depending on the number of modules 30a-n, the system 10 can have a capacity from a few kilowatts to a hundred kilowatts or more. Typically, the number of modules is somewhat matched to meet the demands of the load because each module 30 represents a significant investment. Moreover, the roof 22 has limited area for conveniently and practically retaining the modules 30. Commonly, a module 30 consists of 36 photovoltaic cells which produce an open circuit voltage (OCV) of 21 to 23 VDC and a max power point voltage of 15 to 17 VDC. Standard power ratings for the solar modules 30 range from 50W to 150W. Thus, for an exemplary system 10, where two kilowatts are desired, as many as forty modules 30 may be needed.

For the most part, the prior art solar modules 30 are somewhat limited by their performance characteristics. In view of this, attempts have been made to optimize the solar module usage so that fewer solar modules 30 or less space are required. Tracking mechanisms have been added to actively orient each solar module 30 so that the incident sunlight is normal to the solar module 30 for increased efficiency. Other attempts at increasing efficiency and applicability of roof mounted solar arrays 20 have involved creating turrets to reduce the footprint thereof. Despite these attempts, solar arrays 20 are still uncommon and underutilized because of the additional expense and complexity these methods provide. As a result, the drawbacks of capacity and expense need to be overcome otherwise the range of practical applications for power from a solar arrays 20 will continue to be limited.

A common method for mounting a solar array 20 on the roof 22 is to mount each solar panel 30 individually and directly onto the surface of the roof 22. This method usually involves the installers carrying each solar panel 30 up to the roof and mounting them one at a time. Usually, the solar modules 30 are put into groups to form panels which, in turn, can be used to form the solar array 20. Solar modules 30 are live, i.e. outputting power, during installation. On a sunny day, the power generation can pose a safety hazard to the installers. There is a need, therefore, for an improved solar module control system which forces an improved module into a default off mode with no power output when not in use. Thus, adequate safety can be assured during installation and at other times of disconnection such as during replacement and repair.

Referring still to FIG. 1, an electrical conduit or conduits (not shown) carry the wiring that electrically interconnects the solar array 20 with the control system 40. The power output of each module 30 is carried individually to a string combiner 42 within the control system 40. Typically, the electrical conduit carries the outputs of the solar array 20 in a low voltage, high current bundle. As the size of the solar, array 20 increases, the thickness of the bundle and, in turn, the electrical conduit increases. As a result, the elect conduit is not only unsightly but represents significant danger if exposed. Thus, there is a need for a solar panel array which provides a high voltage and low current output that can be carried in relatively small cables which pose a minimal safety risk.

The control system 40 includes a central inverter 44 for changing the raw power from the string combiner 42 into usable power for the load 26. The central inverter 44 includes a matching DC/DC converter 46 and an AC/DC converter 48. An optional battery 50 is also shown disposed between the matching DC/DC converter 46 and the AC/DC converter 48 for use in an off grid system or as part of an uninterruptable power supply (hereinafter "UPS"). The matching converter 46 drops the raw solar array power down from the string combiner 42 to a desired level. When a battery 50 is used, the typical desired level of voltage is 54V. Thus, the power generated by the solar array 20 may be stored in the battery for use during the night or fed to the AC/DC converter 48 for use by the load 26 or sale via the utility grid 28. The AC/DC converter 48 receives the 54VDC power and outputs an AC current at a desired voltage and frequency such as for example 120, 208 or 240 VAC at 50 or 60 Hz. Converters 46, 48 are well known to those of ordinary skill in the pertinent art and, therefore, not further described herein.

The matching converter 46 may also include maximum power point tracking (hereinafter "MPPT") for varying the electrical operating point so that the solar array 20 delivers the maximum available power. This and other techniques for effectively using power generated by solar arrays are common. An example is illustrated in U.S. Pat. No. 6,046,919 to Madenokouji et al. and is incorporated herein by reference. From the foregoing, it may be observed that the MPPT optimizes the solar array 20 as a monolithic unit.

In actuality, the solar array 20 is made up of solar modules 30 that each typically includes thirty-two cells divided into two groups of sixteen. Each of the solar module cells and solar modules 30 may be from different manufacturers and have varied performance characteristics. Moreover, shading by clouds and the like varies the output from cell to cell and module 30 to module 30. Thus, significant improvements in the efficiencies of the solar panels 30 can be realized if each solar module 30 can be operated at peak power levels. Similarly, each group of sixteen cells or even each cell's performance can be enhanced by corresponding optimization. Such performance would permit solar arrays with less panels to reduce the cost of a given installation and broaden the range of practical applications for solar power. There is a need, therefore, for a cost effective and simple control system which can greatly increase efficiency in new and existing solar arrays.

Further, the typical solar array 20 has a variable output not only throughout the day but the output voltage also varies according to other parameters such as temperature. As a result, the central inverter 44 is also required to be a variable regulator to control these variations. In the United States, galvanic isolation is required for connection to the utility grid 28. The galvanic isolation is usually achieved by a 60 Hz transformer on the output of the central inverter 44. These prior art necessities further increase the cost and complexity of the control system 40. A solar array which does not need the central inverter 44 to act as a variable regulator or galvanic isolation would advantageously reduce the cost and complexity of the control system.

Further still, solar arrays 20 that are configured for grid connect only (without UPS function available) operate only while the utility grid 28 is on. In a problematic manner, if a utility grid outage occurs, the power generated by the solar array 20 cannot be accessed to run the load 26. Even for periodic outages lasting for only seconds, requirements are such that the solar array 20 cannot be reconnected for five minutes after the utility grid power has returned. Thus, a need exists for a solar array control unit which can supply power to the load even when a utility grid outage occurs.

SUMMARY OF THE INVENTION

The present invention is directed to a control unit for controlling an output of a solar module. The control unit includes a converter for coupling to the output of the solar module, the converter being configured and arranged to convert the output to a high voltage and low current.

It would be desirable to provide a solar array with increased capacity, for a given size, while reducing the complexity and expense so that solar power may be used more economically and for a wider range of applications.

It would be desirable to provide a solar panel array which optimizes the power output at a subcomponent level to increase the overall power generated.

It would be desirable to provide a control system for a solar array which can be retrofit onto existing arrays to provide increased power generation.

It would be desirable to provide a control system for a solar panel which defaults in an off mode for allowing safe installation.

It would be desirable to provide a control system which allows for utilization of the power generated by a solar array even when the grid power is down.

It would be desirable to provide a simplified control system which utilizes standard, off-the-shelf components. It would further be desirable to provide an inverter that is standard. In a further embodiment, the inverter would also provide galvanic isolation from the utility grid.

It would be desirable to provide a solar array which produces power at a relatively high voltage and low current to allow for relatively small cables to carry the power in a safe and convenient manner. It would further be desirable for the solar array power to be at a desirable DC voltage to allow use of off-the-shelf components. In one embodiment, a control unit controls an output of a solar device. The control unit includes a converter coupled to the output of the solar device such that the solar device output is converted to a high voltage and low current. Preferably, the high voltage is between approximately 200 and 600 VDC and the solar device is selected from the group consisting of a solar module, a group of solar cells and a solar cell. The converter also preferably includes MPPT.

Still another embodiment is directed to a control unit for a solar module in a solar array for maximizing the output of the solar module. The control unit includes a converter for coupling to the cells of the solar module and, thereby, maximize a power output of each cell.

Yet still another embodiment is a solar module array including a plurality of solar modules connected in parallel and a low voltage to high voltage DC/DC converter coupled to each solar module for maximizing a power output by each respective module. Preferably, the solar module array also includes a DC/AC inverter coupled to an output of the DC/DC converters for outputting a usable power to a load.

It should be appreciated that the present invention can be implemented and utilized in numerous ways, including without limitation as a process, an apparatus, a system, a device and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF PREFERRED EMBODIMENTS

Figure 1:
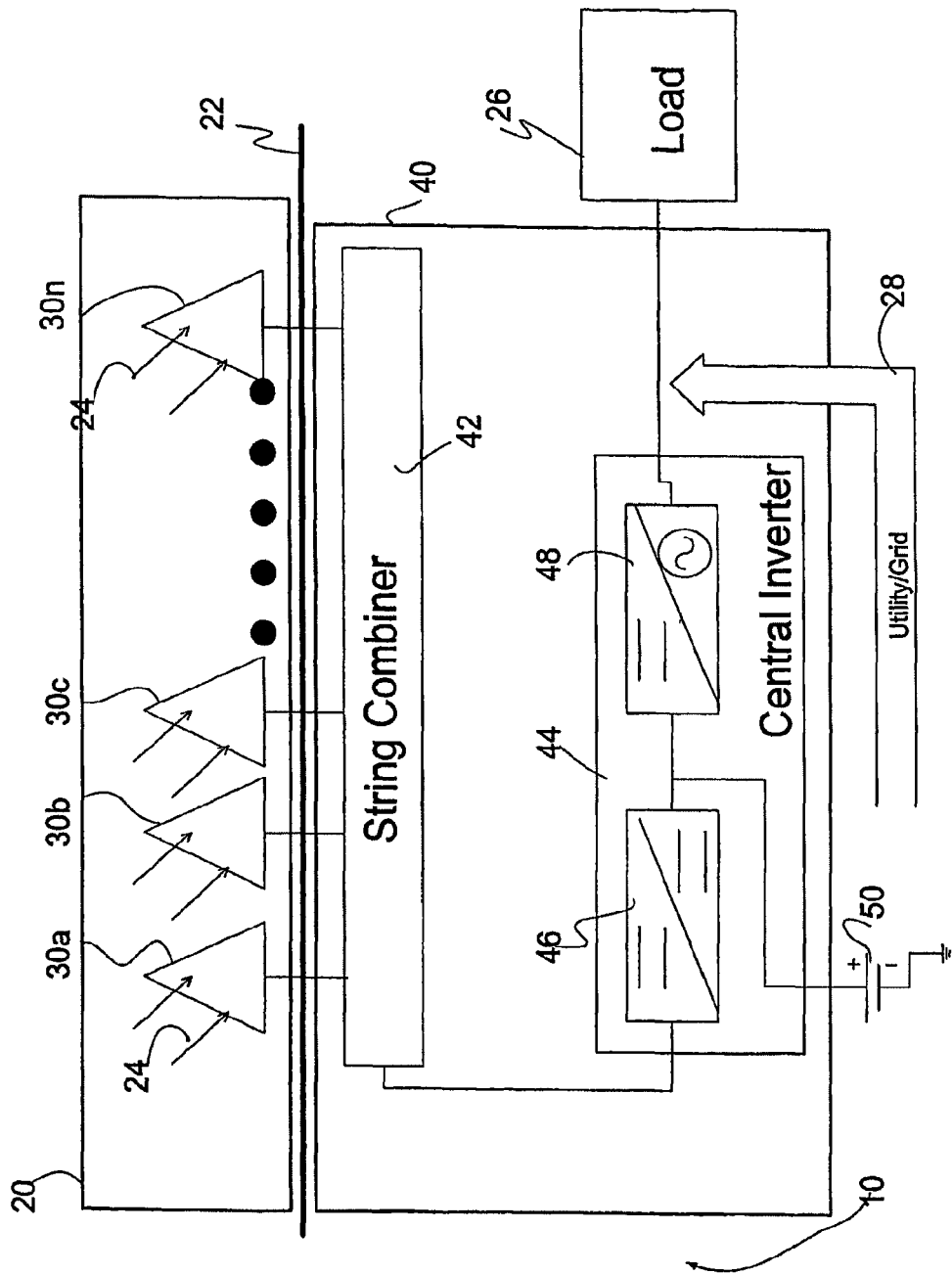
FIG. 1 is a schematic diagram of a conventional solar panel array installation.

The present invention overcomes many of the prior art problems associated with solar arrays. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Figure 2:
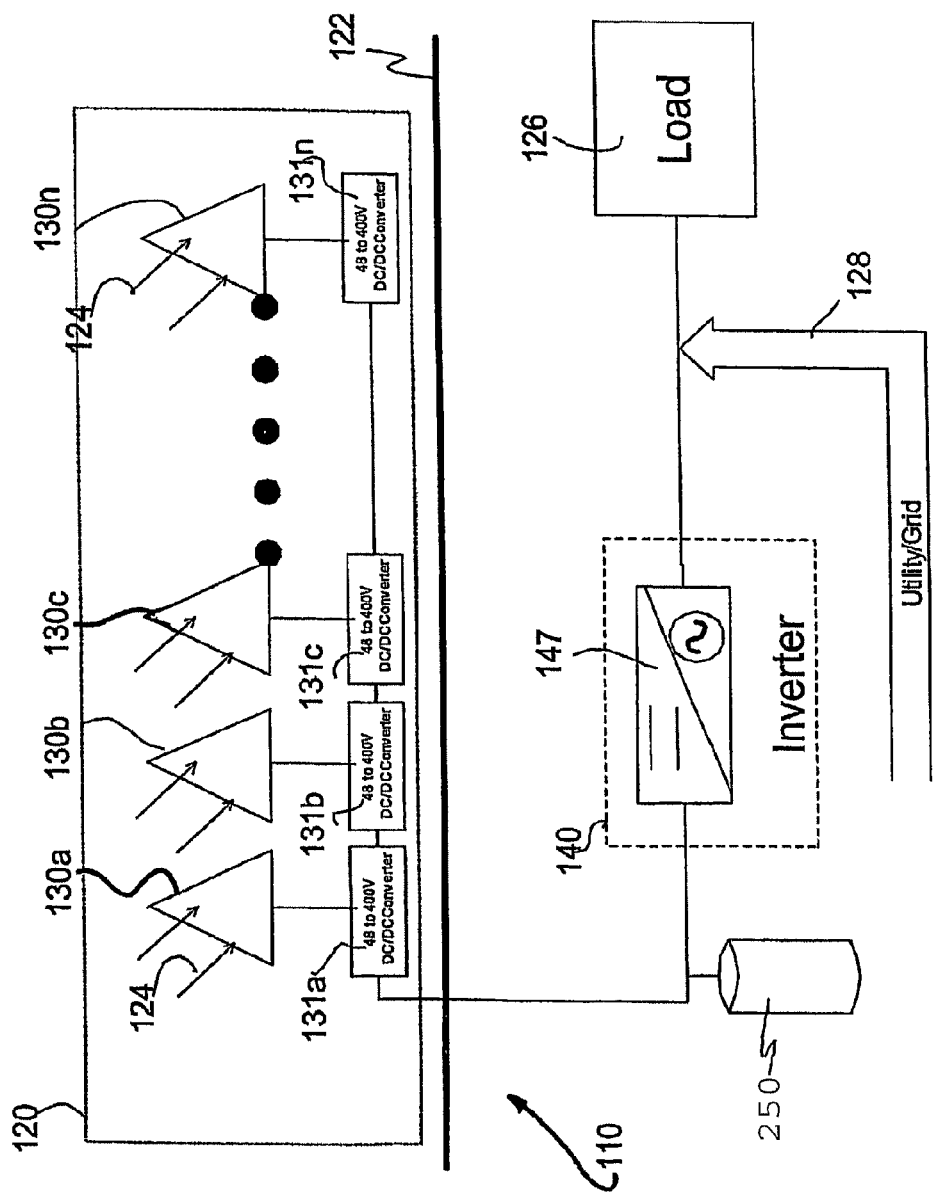
FIG. 2 is a schematic diagram of a solar panel array installation constructed in accordance with the subject disclosure.

Referring to FIG. 2, an improved solar array power generation system is referred to generally by the reference numeral 110. As will be appreciated by those of ordinary skill in the pertinent art, the system 110 utilizes some similar components as the system 10 described above. Accordingly, like reference numerals preceded by the numeral "1" are used to indicate like elements whenever possible. The system 110 includes a roof mounted solar array 120 electrically connected to a control system 140. The solar array 120 has a plurality of solar modules 130a-n. Each solar module 130a-n has a corresponding DC/DC converter 131a-n for converting the raw panel output to a nominal 400 VDC output. Thus, the modules 130 may be easily connected in parallel and, in turn, connected to the control system 140 by a relatively small, safe, high voltage, low current cable (not shown). The resulting 400 VDC level is more suitable for the creation of 120 or 240 VAC than, for example, a 12 VDC car battery. Another advantage realizable by use of the converters 131 is that relatively high switch frequencies can be employed to significantly reduce the size and filtering requirements of the system 110.

In a further embodiment, the DC/DC converters 131 include MPPT. The DC/DC converter 131 with MPPT maximizes the module output according to the present operating conditions of the solar module 130. For example, module 130a may be temporarily shaded by a cloud or object while module 130c is receiving direct sunlight. Under such circumstances, the performance characteristics of panels 130a and 130c would be different, e.g., the optimum power settings for each panel would not be the same. The corresponding DC/DC converters 131a and 131c would uniquely adjust the module's operation such that modules 130a and 130c will produce the maximum power possible individually. Accordingly, the maximum power output of the solar array 120 is maximized and fewer modules 130 may be employed to produce comparable power to prior art systems.

In a preferred embodiment, each module 130 contains thirty-two cells divided into two groups of sixteen. A diode (not shown) is commonly disposed between each group of sixteen cells to prevent reverse current flow during shady conditions and other events which may cause variation in panel output. A plurality of DC/DC converters 131 regulate the output of each group of sixteen cells of the module 130 by picking up the output at the diode. Thus, the advantages of the subject disclosure may be utilized in new and existing solar modules by retrofit. In still another embodiment, the DC/DC converters 131 are connected to maximize the output of each cell of the module 130.

In a further embodiment, the DC/DC converters 131 are also configured to require a signal from the control system 140 to output power. If the panel 130 is not receiving this signal, then the default mode of no power output is achieved. Consequently, installers can handle panels 130 on a sunny day without concern for the live power generated thereby.

The control system 140 is also improved by further simplification in the preferred system 110. The control system 140 includes a single DC/AC inverter 147. The DC/AC inverter 147 prepares the raw power from the solar array 120 for use by the load 126 or sale to the utility company via the utility grid 128. In the preferred embodiment, the inverter 147 is a relatively simple, low dynamic range, off-the-shelf high voltage inverter for dropping the voltage down and creating the desired frequency. Since the DC/DC converters 131 regulate the power outage from the solar panels 130, the control system 140 can be optimized for efficiency since a very small input voltage range is required for operation. In an embodiment where the solar array 120 outputs 400VDC, a standardized inverter 147 can be used to beneficially and significantly reduce the wiring complexity and, thereby, the cost of the control system 140. In a further embodiment, galvanic isolation can be maintained in the standardized inverter 147. Accordingly, the control system 140 is further simplified.

Figure 3:
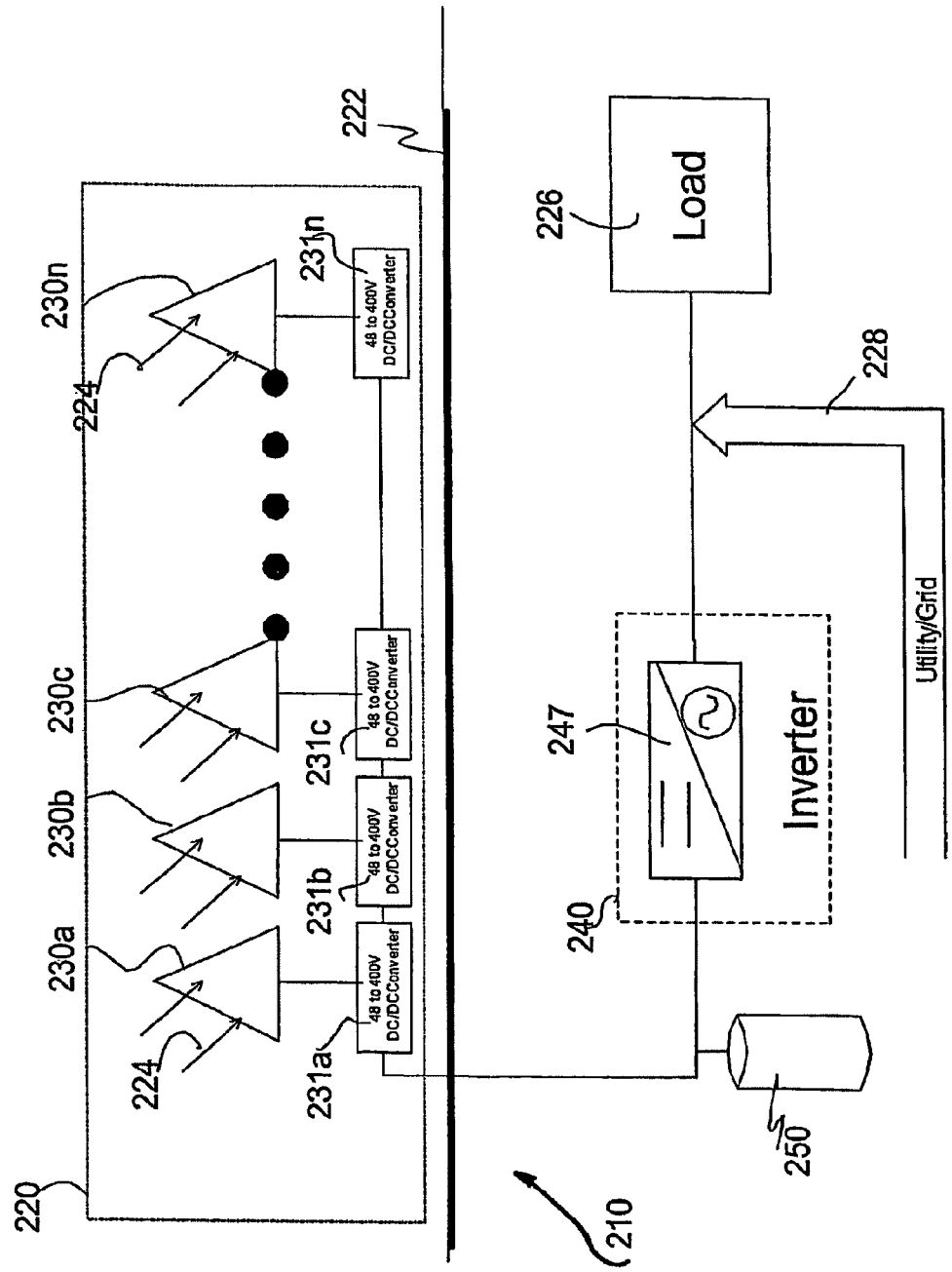
FIG. 3 is a schematic diagram of another solar panel array installation constructed in accordance with the subject disclosure.

Referring now to FIG. 3, as will be appreciated by those of ordinary skill in the pertinent art, the system 210 utilizes the same principles of the system 110 described above. Accordingly, like reference numerals preceded by the numeral "2" instead of the numeral "1", are used to indicate like elements. An optional energy storage device 250 is disposed between the control system 240 and the solar array 220. In one embodiment, the energy storage device 250 is a high voltage flywheel energy storage system which ideally operates at 400V. Accordingly, the output of the DC/AC inverter 247 is matched to optimize the operating efficiency of the high voltage flywheel. Acceptable 6 kWh high voltage energy flywheels are available from Beacon Power Corporation in Wilmington, Mass. In another embodiment, the energy storage device 250 is a conventional battery.

In still another embodiment, the energy storage device 250 is a capacitor and the system 210 acts as an uninterruptible power supply. The capacitor 250 charges during normal operation as the solar array 220 and utility grid 228 provide power to the load 226. In a system with a conventional battery, such operation would shorten the life of the battery as is known to those of ordinary skill in the pertinent art. However, with a capacitor such short life is avoided.

During an interruption of utility grid power, the capacitor discharges to provide interim power to the load 226 until an electronic switch (not shown) can be actuated to allow the solar array 220 to meet the demand of the load 226. It is envisioned that the capacitor will be able to meet the demand for at least twenty seconds although advantages would be provided by a capacitor with only a few seconds of sustained power output. Thus, the power output from the solar array 220 can still be accessed even when the utility grid 228 is down. In a further embodiment, the capacitor is what is commonly known as an electro-chemical capacitor or ultra capacitor. The capacitor may be a carbon-carbon configuration, an asymmetrical carbon-nickel configuration or any suitable capacitor now known or later developed. An acceptable nominal 48V, 107F ultra capacitor is available from ESMA of the Troitsk Moscow Region in Russia, under model no. 30EC104U.

In another embodiment, an alternative energy source such as a conventional fuel burning generator, fuel cell or other suitable alternative acts as a backup in combination with a solar array.

While the invention has been described with respect to preferred embodiments, those skilled in the art will readily appreciate that various changes and/or modifications can be made to the invention without departing from the spirit or scope of the invention as defined by the appended claims.

What is claimed is:
1. A solar power generation system comprising:
a plurality of solar modules for generating a solar module output power (SOP) having a solar module output voltage (SOV) and a solar module output current (SOI);
a plurality of DC-to-DC power converters,
wherein each DC-to-DC power converter is coupled to only one respective solar module of the plurality of solar modules,
wherein each DC-to-DC power converter is configured and arranged to convert the SOP for each solar module to a converted solar module output power (COP) having a converted output voltage (COV) that is higher than the SOV and a converted output current (COI) that is lower than the SOI, wherein a plurality of outputs of the DC-to-DC power converters are connected to supply the COP to a load, and wherein each of the DC-to-DC power converters is configured to prohibit output of the COP in the absence of a control signal from a control system.

2. The solar power generating system of claim 1, wherein the control system includes a DC-to-AC inverter.

3. The solar power generating system of claim 2, wherein the DC-to-AC inverter is disposed between the outputs of the DC-to-DC converters and the load.

4. The solar power generating system of claim 1, wherein the SOV is approximately 48V and the COV is at least 200V.

5. The solar power generating system of claim 1, wherein the plurality of the outputs of the DC-to-DC power converters are connected in series to supply the COP to the load.

6. A solar power generation system comprising:
a plurality of solar modules for generating a solar module output power (SOP) having a solar module output voltage (SOV) and a solar module output current (SOI);
a plurality of DC-to-DC power converters,
wherein each DC-to-DC power converter is coupled to only one respective solar module of the plurality of solar modules,
wherein each DC-to-DC power converter is configured and arranged to convert the SOP for each said solar module to a converted solar module output power (COP) having a converted output voltage (COV) that is higher than the SOV and a converted output current (COI) that is lower than the SOI,
wherein the plurality of the outputs of the DC-to-DC power converters are connected in series to supply the COP to the load.

7. The solar power generation system of claim 6, wherein each of the DC-to-DC power converters is configured to prohibit output of COP from the DC-to-DC power converter in the absence of a control signal from a control system.

8. The solar power generating system of claim 6, wherein the control system includes a DC-to-AC inverter.

9. The solar power generating system of claim 8, wherein the DC-to-AC inverter is disposed between the outputs of the DC-to-DC converters and the load.

10. The solar power generating system of claim 6, wherein the SOV is approximately 48V and the COV is at least 200V.

11. A method for generating solar power, the method comprising:
generating, by a plurality of solar modules, a solar module output power (SOP) having a solar module output voltage (SOV) and a solar module output current (SOI);
converting, by a plurality of DC-to-DC converters, the SOP to a converted output power (COP) having converted output voltage (COV) that is higher than the SOV and a converted output current (COI) that is lower than the SOI,
wherein each DC-to-DC power converter is coupled to only one solar module of the plurality of solar modules,
wherein a plurality of the outputs of the DC-to-DC power converters are connected to supply the COP to a load; and
wherein, in the absence of a control signal from a control system, prohibiting output of the COP from the DC-to-DC power converter, and
wherein, in the presence of the control signal, outputting the COP.

12. The method of claim 11, further comprising connecting the plurality of the outputs of the DC-to-DC power converters in series to supply power output to the load.

13. The method of claim 11, wherein the control system includes a DC-to-AC inverter.

14. The method of claim 13, wherein the DC-to-AC inverter is disposed between the outputs of the DC-to-DC converters and the load.

15. The method of claim 11, wherein the SOV is approximately 48V and the COV is at least 200V.

16. A method for generating solar power, the method comprising:
generating, by a plurality of solar modules, a solar module output power (SOP) having a solar module output voltage (SOV) and a solar module output current (SOI);
converting, by a plurality of DC-to-DC converters, the SOP to a converted output power (COP) having converted output voltage (COV) that is higher than the SOV and a converted output current (COI) that is lower than the SOI,
wherein each DC-to-DC power converter is coupled to only one solar module of the plurality of solar modules, and
wherein a plurality of the outputs of the DC-to-DC power converters are connected in series to supply the COP to a load.

17. The method of claim 16, further comprising, in the absence of a control signal, prohibiting output of the COP from the DC-to-DC power converter and, in the presence of the control signal, outputting the COP.

18. The method of claim 17, wherein the control system includes a DC-to-AC inverter.

19. The method of claim 18, wherein the DC-to-AC inverter is disposed between the outputs of the DC-to-DC converters and the load.

20. The method of claim 19, wherein the SOV is approximately 48V and the COV is at least 200V.

* * * * *

UNITED STATES PATENT AND TRADEMARK OFFICE
CERTIFICATE OF CORRECTION

PATENT NO. : 8,669,675 B2  
APPLICATION NO. : 13/785857  
DATED : March 11, 2014  
INVENTOR(S) : F. William Capp et al.

Page 1 of 1

It is certified that error appears in the above-identified patent and that said Letters Patent is hereby corrected as shown below:

In the specification

Column 2, Line 35:
Delete "solar," and insert --solar--

Signed and Sealed this
Thirty-first Day of May, 2016

Michelle K. Lee
*Director of the United States Patent and Trademark Office*